Sept. 14, 1926.  1,599,420
A. H. KLESA
DRAFT GEAR FOR TRAILER VEHICLES
Filed Feb. 21, 1923  2 Sheets-Sheet 1
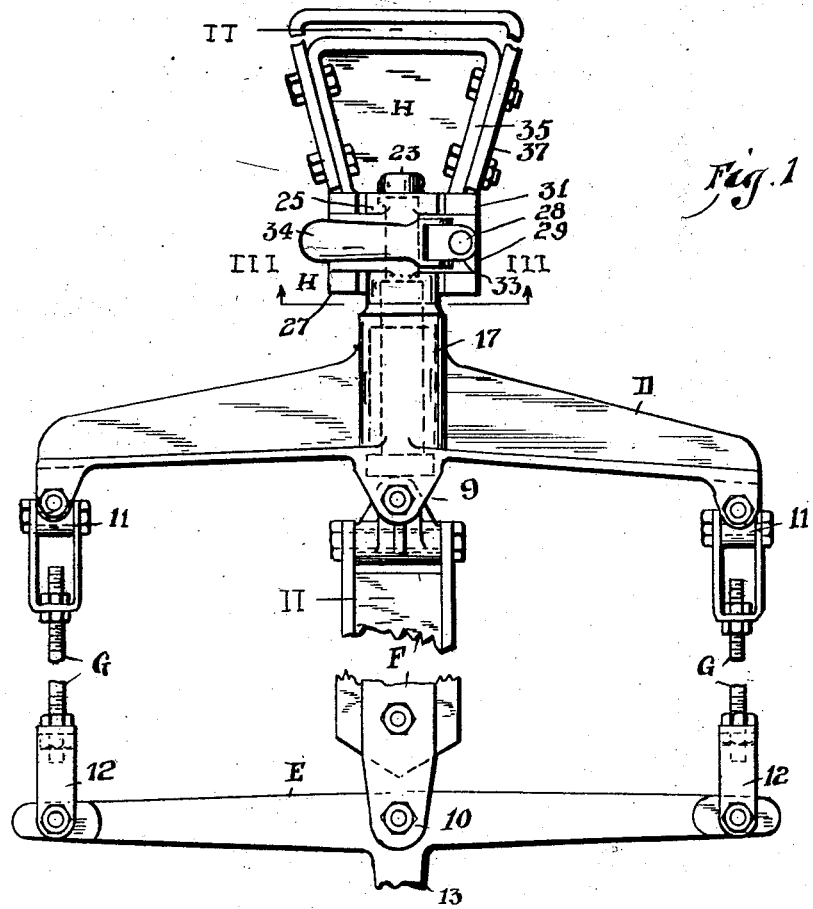
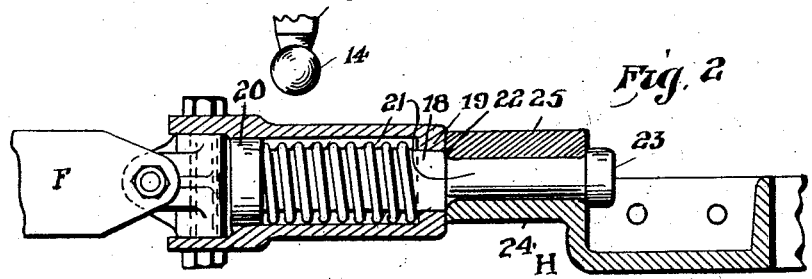
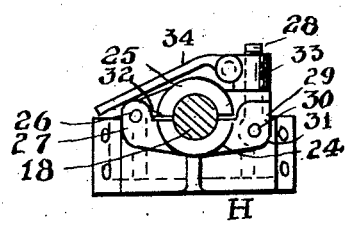
WITNESS
R. F. Dilworth
INVENTOR.
Albert H. Klesa
BY Edward A. Laurence
his ATTORNEY.

Sept. 14, 1926.
A. H. KLESA
1,599,420
DRAFT GEAR FOR TRAILER VEHICLES
Filed Feb. 21, 1923　　2 Sheets-Sheet 2
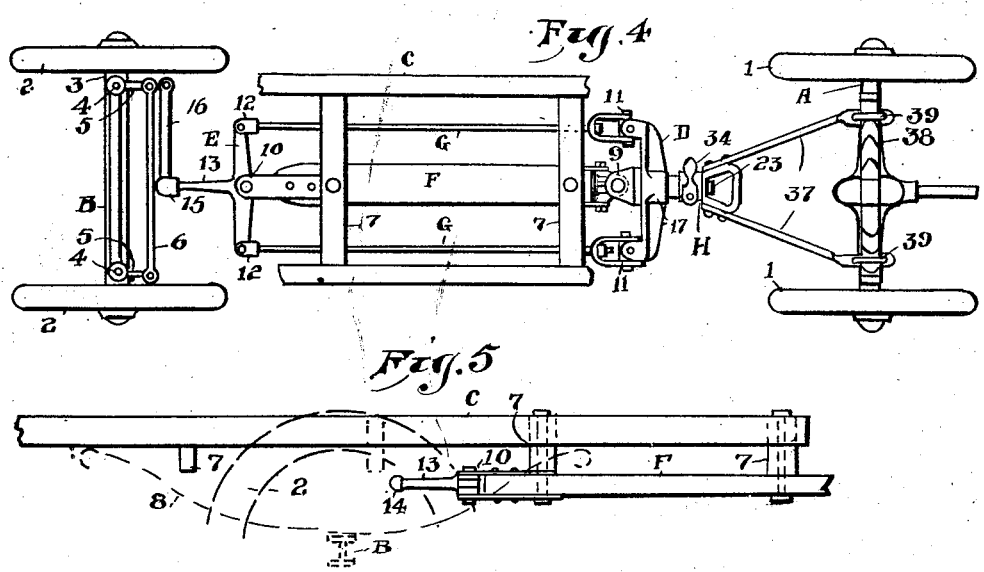
INVENTOR.
Albert H. Klesa
BY Edward A. Lawrence
His ATTORNEY.

Patented Sept. 14, 1926.

1,599,420

UNITED STATES PATENT OFFICE.

ALBERT H. KLESA, OF STOW, OHIO.

DRAFT GEAR FOR TRAILER VEHICLES.

Application filed February 21, 1923. Serial No. 620,356.

My invention consists in a new and improved draft gear for two-wheeled trailer vehicles.

It has become common practice, especially since the introduction of motor vehicles into general use, to attach one or more trailers to a lead vehicle, the latter being itself either power-driven or animal-drawn.

Much difficulty, however, has been experienced in getting the vehicles to track properly. Thus, in rounding road curves and street corners, the trailers tend to "cut the corner," taking the ditch or mounting the curb, even when the lead vehicle swings wider than is safe in traffic. Again, in backing, a two-wheeled trailer tends to turn in a direction opposite to that in which the vehicle to which it is hitched is turning. Where a plurality of trailers are hitched in tandem, an attempt to back up usually results in almost hopeless confusion.

Therefore, one of the objects which I have in view is the provision of practical and efficient means whereby a two-wheeled trailer, or a plurality of two-wheeled trailers hitched in tandem to the lead vehicle, will be caused to accurately track with the lead vehicle both in forward travel and in backing.

Another object which I have in view is the provision of means whereby the guiding elements of the draft gear will be maintained in tension, thus avoiding buckling.

Another object which I have in view is the provision of a draft gear which will enable a trailer to be quickly hitched to or unhitched from the lead vehicle or vehicle in front.

Generally speaking, my improved draft gear consists of a cross head which is pivotally mounted on the trailer and connected with the lead vehicle in such a manner that it will be maintained in parallelism with the axis of the rear axle of the lead vehicle, and operative connection between said crosshead and the wheels of the trailer.

Means are provided for maintaining the connections in tension to avoid buckling.

Means are also provided for the quick and easy hitching of a trailer to or unhitching the same from the lead vehicle.

Means are also provided for allowing for torsion between the vehicles.

Other novel features of construction and arrangement of parts will appear from the following description.

In the accompanying drawings, which, however, are merely intended to illustrate the best embodiment now known to me of the principles of my invention, Fig. 1 is a broken plan view showing my invention adapted for use with a two-wheeled trailer; Fig. 2 is a section taken along the line II—II in Fig. 1; Fig. 3 is a section taken along the line III—III in Fig. 1; Fig. 4 is a plan view showing the draft gear illustrated in Fig. 1, in use to hitch a two-wheeled trailer to a draft vehicle, the chassis frame being partially broken away, and Fig. 5 is a side view of the trailer chassis, the springs, axle and wheels being indicated in dotted lines.

The following is a detailed description of the drawings.

A represents the rear axle of the draft vehicle, in the drawings shown as a Ford automobile, upon which are mounted the driving wheels 1. B is the axle of the two-wheeled trailer having its wheels 2 mounted on spindle axles 3 which are pivotally connected to the axle B on the vertical axes 4, 5 representing the steering arms which are connected by the usual drag link 6. C represents the chassis frame of the trailer having cross members 7, and supported on the axle B by the springs 8.

D represents a front crosshead connected to the lead vehicle in a manner later described, but, generally, of such a character that it is maintained in a vertical plane parallel with the vertical plane which includes the rear axle A, or, in other words, at right angles to the longitudinal axis of the lead vehicle. E represents a second crosshead mounted adjacent to the trailer axle B and connected to the crosshead D in such a manner as to maintain a constant relation thereto.

The two crossheads are centrally pivoted, either directly to the chassis frame C, or as shown, to the opposite ends of a longitudinally disposed tongue or member F which is bolted to the underside of the chassis crossmembers 7 at the center of the same. Thus, the front end of the tongue F is connected to the crosshead D by the universal joint 9 while the rear end of the tongue is connected to the rear crosshead E by the joint 10 having a vertical axis.

The extremities of the crossheads are connected together by the connecting rods G which are connected to the front crosshead by the universal joints 11 and to the rear crosshead by the joints 12 having vertical axes. The length of the rods G are adjustable as shown so that said connecting rods are always in tension when the swing of the front crosshead is communicated to the rear crosshead, and said crossheads are maintained in parallelism.

The spindles 3, upon which the trailer wheels 2 are mounted, are coupled up to the rear crosshead D in such a manner as to turn in unison with said crosshead, but in the reverse direction.

Thus, 13 is an arm rigid or integral with the crosshead E and extending rearwardly from the axis of its rotation. The end of said arm 13 is operatively connected to said spindles. Thus said arm has a ball end 14 which is journaled in a socket 15 on the end of a lever 16 which is connected to one of the steering arms 5. As already stated, the connection is to the arm 5 which will produce a swing to the spindles which is the reverse of the swing to the crosshead, but of like degree.

The attachment of the front crosshead D to the lead vehicle is such as to take up torsion on a horizontal axis, and also to permit quick and easy hitching and unhitching.

Thus I have shown the crosshead D provided with a centrally disposed, cylindrical sleeve 17 in which is slidably mounted the draw pin 18. The front end of the sleeve is provided with an internal flange forming the annular shoulder 19. The pin 18 has a head 20 which slides in the sleeve, and 21 is a helical spring coiled about the pin between its head and the shoulder. Thus a forward pull on the pin 18 will be resiliently transferred to the crosshead D by the compression of the spring 21.

The forwardly protruding portion of the pin 18 is provided with a portion 21 of reduced diameter, defined at the rear by the shoulder 22 and at the front end by the head 23. H is a block, such as a casting having formed on its upper face the lower half 24 of a sleeve socket of proper radius to snugly fit about the smaller diameter of the pin 18. The sleeve is completed by the top plate 25 pivotally attached to one side of the block by means of the bolt 26 extending through the opposed pierced ears 27 of the block H and extending through a transverse hole in the tail of the plate 25. 28 is a bolt having its base formed of an integral transversely disposed sleeve 29, and 30 is a pivot bolt extending through said sleeve and having its ends extending through the opposed pierced ears 31 on the block H. The free end of the plate 25 is slotted as at 32, so that when it is swung down in place over the draw pin 18, the bolt 28 may be wound vertically to engage said slot, and the nut 33 screwed down on the bolt against the plate 25, thus clamping the plate on the block and also clamping the draw pin in its socket. 34 is a handle pivoted to the nut 33 on a horizontal axis, so that said handle may be raised and used to tighten or loosen the nut. If the nut be loosened, so that the bolt 28 may be swung out of engagement with the slotted end of the plate 25, said plate may be raised, and the draw pin 18 lifted from its socket, thus unhitching the trailer from the lead vehicle. Likewise when the draw pin 18 is placed in half socket of the block, the plate 25 swung into the position shown, the bolt 28 swung up into engagement with the slotted end of the plate and the nut 33 tightened, the trailer is hitched to the lead vehicle.

The method of connecting the bars 37 to the front vehicle may be varied to suit different vehicle combinations. Thus said bars may be connected directly to the chassis, or to the rear axle A.

The block H has the forwardly flaring side flanges 35 connected together at the front edge of the plate by the cross flange 36. The flanges 35 are pierced to receive the bolts by which the rear ends of the connecting bars 37 are secured to the block H. The front ends of the bars 37 are attached to the lead vehicle. Thus, in the case of a Ford automobile the bars are extended under the rear spring 38 and are secured thereto at either side of its center by the U bolts 39 encompassing the spring and having their ends extending down through holes in the bars and secured by nuts.

It is evident that the crosshead D will thus be maintained in a vertical plane parallel with the vertical plane in which the axle A is included, but said axle and said crosshead may turn relative to each other on horizontal axes without danger.

It is also evident that when in rounding a curve or turning a corner, the driving axle turns to one side or the other, the crossheads D and E will swing in unison, therewith thus maintaining their parallelism. This swinging of the crossheads will result in turning the spindles 3 in the reverse direction but to the same degree. Thus the trailer will faithfully follow the curve or turn which is being taken by the rear wheels of the lead vehicle, and therefore the trailer will track with the rear wheels of the lead vehicle.

In backing, the crossheads will similarly reproduce the turn of the axle A, and thus shift the wheels of the trailer so that said trailer will describe a curve which will be followed by the wheels of the lead vehicle. Thus the trailer will always turn in the same direction as the lead vehicle either in forward travel or in backing.

It is evident that when the connecting rods G are kept properly taut, they are both maintained in tension, so that no buckling or bending, which would alter the relation between the crossheads can occur.

It is quite evident that by hitching a plurality of trailers together, the crossheads of the vehicles being connected to swing in unison, any number of trailers which can be pulled by the lead vehicle, may thus be hitched together in a train, and such a train may be caused to travel either forwardly or backwardly around sharp curves and corners with ease.

What I desire to claim is:—

1. A coupling for draft gear for connecting a trailer vehicle with a vehicle in front thereof comprising, a block containing a half-socket attached to the front vehicle, a draw pin connected to the draft gear and adapted to engage and extend through said socket, and a half-socket member adapted to be clamped down on said block to complete said socket member to hold the draw pin therein, said pin having an enlarged head at its front end to prevent its being drawn through the socket.

2. A coupling for draft gear for connecting a trailer vehicle with a vehicle in front thereof comprising, a block containing a half-socket attached to the front vehicle, a draw pin connected to the draft gear and adapted to engage and extend through said socket, a half-socket member pivotally attached to said block and adapted to be clamped down thereon to complete the socket and hold the draw pin therein, said pin having an enlarged head at its front end to prevent its being drawn through the socket.

3. A coupling for draft gear for connecting a trailer vehicle with a vehicle in front thereof comprising a draw pin connected to the draft gear and having a cylindrical portion defined at each end by a circumferential shoulder, a block attached to the front vehicle and provided with a half-socket into which the cylindrical portion of said pin fits, and a half-socket member adapted to be clamped on said block to complete said socket and hold the draft pin therein.

4. A coupling for draft gear for connecting a trailer vehicle with a vehicle in front thereof comprising a draw pin connected to the draft gear and having a cylindrical portion defined at each end by a circumferential shoulder, a block attached to the front vehicle and provided with a half-socket into which the cylindrical portion of said pin fits, and a half-socket member pivotally attached to said block and adapted to be clamped down thereon to complete the socket and hold the draft pin therein.

5. In draft gear for a two-wheeled trailer vehicle having its wheels mounted on spindles pivotally attached to the ends of the axle, the combination of a pair of spaced apart crossheads pivotally mounted on the longitudinal axis of the vehicle chassis, operative connection between the front crosshead and the lead vehicle whereby the latter turns in unison with the former, parallel connecting rods connecting the corresponding ends of the two cross heads, a drag link connecting the wheel spindles, and operative connection between the drag link and the rear cross head whereby said spindles are turned by the turning of the rear cross head.

6. In draft gear for a two-wheeled trailer vehicle having its wheels mounted on spindles pivotally attached to the ends of the axle, a pair of spaced apart cross heads pivotally mounted on the longitudinal axis of the chassis in advance of the axle, the front cross head being operatively connected to the lead vehicle to turn in unison with the latter, parallel link connection between the corresponding ends of the cross heads, a drag link connecting the spindles, and operative connection between the drag link and the rear cross head whereby when said cross head is turned the wheels are simultaneously turned in the proper direction.

7. In draft gear for a two-wheeled trailer vehicle having its wheels mounted on spindles pivotally attached to the ends of the axle, a pair of spaced apart cross heads pivotally mounted on the longitudinal axis of the chassis in advance of the axle, the front cross head being operatively connected to the lead vehicle to turn in unison with the latter, parallel link connection between the corresponding ends of the cross heads, and operative connection between the drag link and the rear cross head whereby the turning of the cross head turns the wheels in the opposite direction.

Signed at Cuyahoga Falls, Ohio, this 15 day of Feb., 1923.

ALBERT H. KLESA.